United States Patent Office 2,829,060
Patented Apr. 1, 1958

2,829,060
MOULD AND METHOD OF MAKING THE SAME

Harold Garton Emblem, Mickleover, and Jack Aston, Melbourne, England, assignors to Rolls-Royce Limited, Derby, England No Drawing. Application October 17, 1955
Serial No. 541,098

Claims priority, application Great Britain
October 25, 1954

17 Claims. (Cl. 106—38.35)

This invention relates to improvements in the preparation of moulds for casting metals, and is concerned with processes of the kind in which a mould structure is formed round an expendable pattern, such as a wax pattern, or a pattern comprised of a material of relatively low melting point, such as a tin-bismuth alloy, polystyrene or cellulose acetate.

It is known in sand moulding technique to use sodium silicate or potassium silicate as the binding agent and to use carbon dioxide to cause the silicate to gel or set.

Carbon dioxide reacts with the silicate to give silica and sodium or potassium carbonate.

With dilute solutions of sodium silicate, however, the silica is not precipitated as such, but forms a silica sol. Because of this it is necessary to use dry carbon dioxide and dry sand. It has now been found that if ammonia is added to the silicate solution, the reaction of carbon dioxide with this mixture results in the formation of a uniform and strong gel.

According to this invention a coating is applied to an expendable pattern which coating comprises a finely divided refractory material suspended in a liquid containing ammonia and sodium or potassium silicate or a mixture of both, in solution, and the coating hardened by the action of carbon dioxide.

The coating may be applied to the pattern as an initial coating or may be applied thereto after the pattern has been initially coated with another material or suitable composition in known manner.

One application of the invention is to produce a "shell mould" i. e. by building up a relatively thick shell by a series of coats, hardening each coating by the application of carbon dioxide and by dusting each wet coating with a refractory. Such a shell mould may have sufficient rigidity in itself for the casting operation but is preferably supported in a coarse refractory powder which may for example be a fireclay grog or sillimanite, both passing a 10 mesh sieve. Such refractory powder may be bound by a fritting agent such as an anhydrous sodium silicate, sodium nitrate, sodium silico fluoride or ammonium phosphate.

Another application of the invention is to produce a relatively thin coating on a pattern, which may involve two or three coating applications, with carbon dioxide hardening and preferably dusting the wet coating with a refractory, the coated pattern being invested in known manner to form a mould. For example one well-known investment suitable for a relatively thinly coated pattern is refractory material bound by an acid sodium silicate solution for example as described in British patent specification No. 650,532. Another suitable investment is a refractory bound by a hydrolysed ethyl silicate solution prepared by hydrolysing ethyl silicate under acid conditions.

Another investment for a relatively thinly coated pattern is a refractory material bound by cement such as Portland cement or a high alumina cement complying with British Standard Specification No. 910, 1947, made into a slurry with water. It is generally advantageous in investing a relatively thinly coated pattern in this manner to vibrate the investment container before the investment slurry sets, thereby to consolidate the mould.

In coatings according to this invention any finely divided refractory material may be used, provided that it does not react with sodium or potassium silicates. Among suitable materials are silica, zircon, zirconia, sillimanite and mullite. To obtain castings with a smooth surface finish, all the refractory in the coating composition should pass a 100 mesh sieve, and preferably at least 85% should pass a 200 mesh sieve. In coatings applied subsequently the refractory may be much coarser, but it is preferred to use only the one coating composition in which all the refractory material passes a 100 mesh sieve.

The numbers of the sizes of mesh of the sieves throughout this specification are according to British Standard Specification No. 410 of 1943 except where otherwise stated.

The refractory material used to dust on to the coating is preferably a slightly coarser grading of the same refractory used in the coating composition. This grading of refractory material may conveniently be used in all the dusting operations. For example if the refractory in the liquid coating composition is zircon, all passing a 200 mesh sieve, the refractory used for the dusting operations can also be zircon, all passing a 72 mesh sieve. However, it is not essential that refractory material of the same composition should be used for both the dusting operation and the coating operation. Examples of refractory materials suitable for use in the dusting operation are zircon, zirconia, sillimanite, mullite and fireclay grog.

The sodium silicate and potassium silicate are preferably used in solution in water and may if desired be used in a solvent comprising water and an organic solvent miscible with water, such as water and ethyl alcohol or water and glycerol.

Suitable sodium silicates include sodium metasilicate and hydrated sodium metasilicates, these must be in solution before they can be used in the coating composition. Other suitable sodium silicates are the liquid sodium silicates, an example of a suitable liquid sodium silicate being an aqueous solution of a sodium silicate having a $Na_2O/SiO_2$ ratio of between 1:3.75 by weight and 1:3.85 by weight with a specific gravity of 1.35.

An example of a suitable potassium silicate is an aqueous solution of a potassium silicate having a $K_2O/SiO_2$ ratio of 1:2.0 by weight, with a specific gravity of 1.3.

The liquid coating may be applied by spraying or dipping or by painting it on to the pattern. There may be included in it wetting agents or de-frothing agents.

The pattern may be removed from the hardened shell either by melting out or in the case of non metallic patterns by dissolving in a suitable solvent, such as trichloroethylene. If desired, the shell may be further hardened by immersion in an hydrolysed ethyl silicate solution, either before or after removal of the pattern until the hydrolysed ethyl silicate ceases to displace air bubbles, usually 3–5 minutes. A suitable ethyl silicate is an ethyl silicate having a silica content of at least 40% and an acidity not exceeding 0.1% as HCl sold under the registered trademark of "Silester" as Silester O. One method of preparing a suitable acid hydrolysed ethyl silicate solution from this material is as follows:

1600 cc. of ethyl silicate (Silester O) are mixed with 840 cc. of industrial methylated spirits (64 o. p. ethyl alcohol); 100 cc. water, and 6 cc. of N/1 hydrochloric acid solution. This mixture should be allowed to stand overnight before use.

Moulds produced by the present invention may include preformed refractory cores or the like which are incorporated in the pattern to provide for hollow formations in the casting. Examples of such cores or the like include those of vitreous silica or those described in British patent specification No. 678,035. In certain cases, however, the core may be built up in the process of the coating of the pattern, the pattern being formed with a hollow interior the walls of which are coated at the same time as the outer walls of the pattern.

The following are examples of methods according to this invention of forming a shell mould:

*Example I*

A coating composition was prepared by diluting 200 ml. of an aqueous solution of a sodium silicate having a $Na_2O/SiO_2$ ratio of 1:3.8 by weight, and a specific gravity of 1.35 with 200 ml. of an ammonia solution prepared by mixing 4800 ml. of water with 320 ml. of an aqueous ammonia solution having a specific gravity of 0.880. 30 ml. of an non-ionic wetting agent sold under the registered trademark of Lissapol as Lissapol N. D. B. and prepared by reacting ethylene oxide with octyl cresol, were added to the diluted sodium silicate solution, followed by 1¼ lbs. of zircon, all passing a 200 mesh sieve as described in the publication "Surface Activity" by J. L. Moilliet and B. Colley, published in 1951, Lissapol is described as a condensation product of ethylene oxide. This was stirred into the solution to give a smooth slurry.

The shell mould structure was prepared by dipping a wax pattern into the coating composition, then dusting the coated pattern with zircon, all of which passed a 72 mesh sieve, followed by hardening the coating composition by the action of carbon dioxide. Two minutes later the covered pattern was again coated with the above coating composition, then dusted with sillimanite powder, all of which passed a 30 mesh I. M. M. standard sieve, and all being retained on an 80 mesh I. M. M. standard sieve, followed by hardening the coating composition by the action of carbon dioxide. Two minutes later, the covered pattern was again coated with the coating composition, and again dusted with sillimanite powder of the grading previously used, followed by hardening the coating composition by the action of carbon dioxide. Ten minutes later, the wax pattern was melted out of the shell mould structure. The resulting shell mould structure was supported in sillimanite powder, all of which passed a 10 mesh sieve, and fired to 1050° C. in the course of 10 hours prior to the casting operation.

*Example II*

A coating composition was prepared by diluting 3000 ml. of an aqueous solution of a sodium silicate having a $Na_2O/SiO_2$ ratio of 1:3.8 by weight, and a specific gravity of 1.35 with 3000 ml. of an ammonia solution prepared by mixing 4800 ml. of water with 320 ml. of an aqueous ammonia solution having a specific gravity of 0.88. 450 ml. of a wetting agent sold under the registered trademark of "Lissapol" as Lissapol N. D. B. were added to the diluted sodium silicate solution followed by 22 lbs. of zircon, all of which passed a 200 mesh sieve. This was stirred into the solution to give a smooth slurry.

The shell mould structure was prepared by dipping a wax pattern into the coating composition, then dusting the coated pattern with zircon, all of which passed a 72 mesh sieve, followed by hardening the coating composition by the action of carbon dioxide. This sequence was repeated a further three times at intervals of two minutes. Thirty minutes later, the pattern was melted out of the shell mould structure. The resulting shell mould structure was supported in sillimanite, all of which passed a 10 mesh sieve, and fired to 1050° C. during the course of 10 hours prior to the casting operation.

*Example III*

A shell mould structure was prepared from a wax pattern using the coating composition of Example II and a fireclay grog containing 44% alumina, with the particle size distribution given below:

| Sieve mesh No.: | Percent retained |
| --- | --- |
| 30 | 0.4 |
| 52 | 16.6 |
| 72 | 27.2 |
| 100 | 22.0 |
| 150 | 24.0 |
| 200 | 7.0 |
| Pass 200 | 1.8 |

The shell mould structure was prepared by dipping the wax pattern into the coating composition, then dusting the coated pattern with the fireclay grog, followed by hardening the coating composition by the action of carbon dioxide.

The sequence was repeated a further three times at intervals of two minutes. After standing overnight the pattern was dissolved out with trichlorethylene. The resulting shell mould structure was supported in sillimanite, all of which passed a 10 mesh sieve, and fired to 1050° C. during the course of 10 hours prior to the casting operation.

*Example IV*

An ammonia solution was prepared by diluting 30 ml. of an ammonia solution having a specific gravity of 0.880 with 200 ml. of water and 150 ml. of glycerol. 300 ml. of the resulting ammonia solution were used to dilute 200 ml. of a sodium silicate solution, having a specific gravity of 1.35 and a $Na_2O/SiO_2$ ratio of 1:38 by weight. 30 ml. of a wetting agent sold under the registered trademark of "Lissapol" as Lissapol N. D. B. were added to the diluted sodium silicate solution, followed by 2 lbs. of silica flour, all of which passed a 200 mesh sieve. This was stirred into the solution to give a smooth slurry.

A shell mould structure was prepared by dipping a wax pattern into the slurry, then dusting the coated pattern with sillimanite powder, all of which passed a 30 mesh 1 mm. standard sieve, and all being retained on an 80 mesh 1 mm. standard sieve, followed by hardening the coating by the action of carbon dioxide. This sequence was now repeated, after an interval of ten minutes. 20 minutes after hardening the last coating, the pattern was melted out of the shell structure. The resulting mould was supported in sillimanite, all of which passed a 10 mesh sieve, then fired at 1050° C. in the course of 10 hours prior to the casting operation.

This coating composition is not recommended for use with a hollow pattern, because of the relatively slow setting time.

*Example V*

A coating composition was prepared by diluting 250 ml. of a potassium silicate solution having a specific gravity of 1.3 and a $K_2O/SiO_2$ ratio of 1:2.0 by weight, with 250 ml. of an ammonia solution prepared by adding 480 ml. of water to 40 ml. of an ammonia solution having a specific gravity 0.880. 50 ml. of a wetting agent sold under the registered trademark of "Lissapol" as Lissapol N. D. B. were now added to the diluted potassium silicate solution, followed by 2 lbs. of zircon, all of which passed a 200 mesh sieve. The zircon was stirred into the solution to give a smooth slurry.

A shell mould structure was prepared by dipping a wax pattern into the coating composition, then dusting the coated pattern with zircon, all of which passed a 72 mesh sieve, followed by hardening the coating by the action of carbon dioxide. This sequence was now repeated twice, at intervals of 5 minutes. 30 minutes after hardening the last coating, the pattern was melted out of the shell mould structure. The resulting mould was supported in sillimanite, all of which passed a 10 mesh sieve, and fired to 1050° C. during the course of 10 hours prior to the casting operation.

*Example VI*

A shell mould structure was prepared as described in Example I. When the structure was hard, it was dipped in an acid hydrolysed ethyl silicate solution, prepared as previously described. The solution absorbed by the mould structure was allowed to gel before the wax pattern was melted out. Gelation of the absorbed solution was completed in less than an hour.

The resulting mould was supported in sillimanite, all of which passed a 10 mesh sieve, and fired to 1050° C. during the course of 10 hours prior to the casting operation.

*Example VII*

A coating composition was prepared by adding 170 ml. of aqueous ammonia solution having a specific gravity of 0.880 to 10 litres of sodium silicate solution having a specific gravity of 1.35 and a $Na_2O/SiO_2$ ratio of 1:3.8 by weight. 22 lbs. of zircon, all of which passed a 200 mesh sieve were stirred into the above mixture to give a smooth slurry. 25 ml. of a mixture of higher aliphatic alcohols sold under the British registered trademark of "Alphanol" as Alphanol 79 were added as a foam inhibitor. Such a foam inhibitor may comprise a mixture of higher aliphatic alcohols, $C_7$–$C_9$ alcohols, with a substantial proportion of 2 ethyl-hexanol. Alphanol 79 is described in the 1954 edition of the British publication "The Society of Chemical Industry Buyers Guide" which was published on December 5, 1953.

A shell mould structure was prepared by dipping a wax pattern into the coating composition, then dusting the coated pattern with calcined kaolin, followed by hardening the coating by the action of carbon dioxide. This sequence was now repeated six times at intervals of five minutes. The calcined kaolin used had the following sieve analysis:

| Sieve No.: | Percentage retained |
|---|---|
| 30 | Nil |
| 52 | 14.2 |
| 72 | 45.4 |
| 100 | 28.6 |
| 150 | 10.7 |
| 200 | 0.9 |
| Pass 200 | Nil |

24 hours after hardening the last coating the pattern was removed by dissolving it out with trichlorethylene. The resulting mould was supported in fireclay grog, all of which passed a 16 mesh sieve, and fired to 1050° C. in the course of 10 hours prior to the casting operation which should be carried out while the mould is hot.

*Example VIII*

A coating composition was prepared by mixing 1700 ml. of sodium silicate solution having a specific gravity of 1.35 and a $Na_2O/SiO_2$ ratio of 1:3.8 by weight with an ammonia solution having a specific gravity of 0.880, with 500 ml. of water and 50 ml. of a non-ionic wetting agent sold under the British registered trademark of "Lissapol" as Lissapol N. D. B. 5 lbs. of calcined kyanite all passing a 200 mesh sieve, were stirred into the above mixture to give a smooth slurry. 2 ml. of a mixture of higher aliphatic alcohols sold under the British registered trademark of "Alphanol" as Alphanol 79 were added as a foam inhibitor.

A shell mould structure was prepared by dipping a wax pattern into the coating composition, then dusting the coated pattern with sillimanite, followed by hardening the coating by the action of carbon dioxide. This sequence was now repeated six times at intervals of 5 minutes. The sillimanite used had the following sieve analysis:

| Sieve No.: | Percentage retained |
|---|---|
| 22 | 2.4 |
| 30 | 20.0 |
| 44 | 22.6 |
| 60 | 19.4 |
| 100 | 18.0 |
| 150 | 8.5 |
| 200 | 5.0 |
| Pass 200 | 4.2 |

24 hours after hardening the last coating the pattern was removed by dissolving it out with trichlorethylene. The resulting mould was supported in fireclay grog, all of which passed a 16 mesh sieve and fired to 1050° C. in the course of 10 hours prior to the casting operation, which should be carried out while the mould is hot.

*Example IX*

A coating composition was prepared by diluting 30 ml. of an aqueous ammonia solution having a specific gravity of 0.880 with 500 ml. of water and 50 ml. of a non-ionic wetting agent sold under the British registered trademark of "Lissapol" as Lissapol N. D. B. then adding to this mixture 850 ml. of sodium silicate solution having a specific gravity of 1.35 and a $Na_2O/SiO_2$ ratio of 1:3.8 by weight and 850 ml. of potassium silicate solution having a specific gravity of 1.3 and a $K_2O/SiO_2$ ratio of 1:2.0 by weight. 4½ lbs. of zircon all passing a 200 mesh sieve were stirred into the above mixture to give a smooth slurry. 2 ml. of a mixture of higher aliphatic alcohols sold under the British registered trademark of "Alphanol" as Alphanol 79 were added as a foam inhibitor.

A shell mould structure was prepared by dipping a wax pattern into the coating composition then dusting the coated pattern with sillimanite, followed by hardening the coating by the action of carbon dioxide. This sequence was now repeated 6 times at intervals of 5 minutes. The sillimanite used had the sieve analysis given in Example VIII. 24 hours after hardening the last coating, the pattern was removed by dissolving it out with trichlorethylene. The resulting mould was supported in fireclay grog, all of which passed a 16 mesh sieve and fired to 1050° C. in the course of 10 hours prior to the casting operation which should be carried out while the mould is hot.

*Example X*

A coating composition was prepared by diluting 70 ml. of an aqueous ammonia solution having a specific gravity of 0.880 with 250 ml. of water and 25 ml. of a non-ionic wetting agent sold under the British registered trademark of "Lissapol" as Lissapol N. D. B. then adding to this mixture 400 ml. of potassium silicate solution having a specific gravity of 1.3 and a $K_2O/SiO_2$ ratio of 1:2.0 by weight. 850 gms. of stabilised zirconia all passing a 200 mesh sieve were stirred into the mixture to give a smooth slurry.

A shell mould structure was prepared by dipping a wax pattern into the coating composition, then dusting the coated pattern with calcined kaolin followed by hardening the coating composition by the action of carbon dioxide. This sequence was now repeated 5 times at intervals of 5 minutes. The koalin used had the following particle size distribution.

| Sieve number: | Percentage retained |
|---|---|
| 30 | 0.5 |
| 44 | 6.4 |
| 60 | 16.0 |
| 100 | 32.4 |
| 150 | 24.0 |
| 200 | 13.6 |
| Pass 200 | 6.8 |

24 hours after hardening the last coating, the pattern was removed by dissolving it out with trichlorethylene.

The resulting mould was supported in fireclay grog all of which passed a 16 mesh sieve and fired to 1050° C. in the course of 10 hours prior to the casting operation, which should be carried out while the mould is hot.

*Example XI*

To obtain moulds for castings having intricate surface detail it is desirable to give the pattern an initial coating by dipping in a refractory slurry using as binder a silica aquasol, then completing the shell mould structure with a coating composition containing sodium silicate and/or potassium silicate together with ammonia and a refractory material, this coating being hardened by the action of carbon dioxide.

The initial coating composition was prepared by adding 3000 ml. of water to 3000 ml. of a silica equasol sold under the British registered trademark of "Syton" as Syton 2X and having a pH of 10, a mean silica particle size of 250 A. and a silica content of 30%. Sufficient of a solution of 33 gms. of primary ammonium phosphate crystals in 300 ml. of water was added to adjust the pH of the diluted silica aquasol to 7.0. For the particular batch of Syton 2X used, a volume of 270 ml. of primary ammonium phosphate solution was necessary. 150 ml. of a non-ionic wetting agent sold under the British registered trademark of "Lissapol" as Lissapol N. D. B. were now added and 50 lbs. of zircon, all passing a 200 mesh sieve were stirred into the mixture. 70 ml. of a wetting agent sold under the British registered trademark of "Manoxol" as Manoxol OT were now added (Manoxol OT is a 60% solution of sodium dioctyl sulphosuccinate in aqueous ethyl alcohol). 10 ml. of a mixture of higher aliphatic alcohols sold under the British registered trademark of "Alphanol" as Alphanol 79 were added as foam inhibitor.

The coating composition used in conjunction with the above was prepared by diluting 270 ml. of Lissapol N. D. B. non-ionic wetting agent with 2700 ml. of water, then adding 150 ml. of aqueous ammonia solution having a specific gravity of 0.880, followed by 9000 ml. of sodium silicate solution having a specific gravity of 1.35 and a $Na_2O/SiO_2$ ratio of 1:3.8 by weight. 26 lbs. of zircon all passing a 200 mesh sieve were stirred into this mixture to give a smooth slurry. 10 ml. of Alphanol 79 were added as foam inhibitor.

A suitable zircon for use in both the above compositions is that sold under the British registered trademark of "Zircosil" as Zircosil D.

A shell mould structure was prepared by dipping a wax pattern in the initial Syton 2X coating composition and allowing the coated pattern to dry for between 1 and 3 hours, preferably for 2½ to 3 hours. The coated pattern was now dipped in the sodium silicate-ammonia coating composition, then dusted with sillimanite followed by hardening the coating by the action of carbon dioxide. This sequence of dipping in the sodium silicate-ammonia composition, dusting with sillimanite and hardening by the action of carbon dioxide was repeated a further six times at intervals of five minutes. 24 hours after hardening the last coating, the pattern was removed by dissolving it out with trichlorethylene. If the object to be cast is large, or has intricate surface details, the pattern should not be removed until 48 hours after hardening the last coating. The resulting mould was supported in fireclay grog, all of which passed a 16 mesh sieve, then fired to 1050° C. in the course of 10 hours prior to the casting operation which should be carried out while the mould is hot. Alternatively the mould may be supported in sillimanite, all of which passes a 10 mesh sieve. This method of preparing a shell mould is also suitable for use with patterns containing pre-formed silica cores. A suitable sillimanite for use in the dusting operations is a sillimanite powder having the particle size distribution given in Example VIII.

If the wax pattern contains intricate surface detail an alternative method of preparing the shell mould structure is to replace the sillimanite used in the first two dusting operations by zircon, all of which passes a 60 mesh sieve and all being retained on a 200 mesh sieve.

Fresh batches of either the Syton 2X coating composition or the sodium silicate-ammonia coating composition may be prepared and added to small quantities remaining after use. It is often advantageous to add extra ammonia to the sodium silicate-ammonia coating composition if this has been used, then allowed to stand overnight. A suitable amount is 10 ml. of aqueous ammonia solution having a specific gravity of 0.880.

*Example XII*

An alternative sodium silicate-ammonia coating composition for use in conjunction with the Syton 2X-zircon initial coating composition described in Example XI may be prepared as follows:

15 ml. of aqueous ammonia solution having a specific gravity of 0.880 were diluted with 250 ml. of water and 25 ml. of a non-ionic wetting agent sold under the British registered trademark of "Lissapol" as Lissapol N. D. B. 900 ml. of sodium silicate solution having a specific gravity of 1.35 and a $Na_2O/SiO_2$ ratio of 1:3.8 by weight were now added. 1½ lbs. of silica flint all passing a 200 mesh sieve and 1 lb. of Stourbridge fireclay grog, having an alumina content of approximately 35% were stirred into the mixture to give a smooth slurry. 1 ml. of a mixture of higher aliphatic alcohols sold under the British registered trademark of "Alphanol" as Alphanol 79 was added as a foam inhibitor. The Stourbridge fireclay grog used had the following particle size distribution.

| Sieve No.: | Percentage retained |
| --- | --- |
| 30 | 0.2 |
| 44 | 2.4 |
| 60 | 19.0 |
| 100 | 39.0 |
| 150 | 26.0 |
| 200 | 11.6 |
| Pass 200 | 1.6 |

The properties of Stourbridge fireclay grogs are described in A. B. Searle, "Refractory Materials, their Manufacture and Uses," 3rd edition, London, 1950, Charles Griffin and Co. Ltd.

With a wax pattern, a shell mould may be prepared using the above coating composition by the procedure given in Example XI. The resulting mould is also supported and fired as described in Example XI.

The following are examples of methods according to this invention of forming a mould by producing a pattern with a relatively thin coating and subsequently investing the pattern:

*Example XIII*

A coating composition was prepared by adding 2800 mls. of water to 300 mls. of a wetting agent sold under the registered trademark of "Lissapol" as Lissapol N. D. B. 1000 ml. of ammonia solution (S. G. 0.880) were added to this mixture, followed by 10,000 ml. of an aqueous solution of a sodium silicate having a $Na_2O/SiO_2$ ratio of 1:3.8 by weight, and a specific gravity of 1.35. 29.5 lbs. of zircon, all passing a 200 mesh sieve were stirred into the solution to give a smooth slurry.

A wax pattern was dipped in the above composition, then immediately dusted with calcined kaolin, all of which passed a 52 mesh sieve, and was retained on a 150 mesh sieve. The coating was next hardened by exposure to carbon dioxide for two minutes. The covered pattern was next again dipped in the coating composition and immediately dusted with calcined kaolin, all of which passed a 30 mesh sieve, and was retained on a 52 mesh sieve. This coating was then hardened by exposure to carbon dioxide for two minutes.

The coated pattern was then attached to a base plate, and an investment container fastened to the base plate by wax. The mould was formed by investing the coated pattern with a slurry prepared from fireclay grog having an alumina content of 44% using as a binding liquid an acid sodium silicate solution prepared from nitric acid and sodium silicate as described in British patent specification No. 650,532 and containing a gelation accelerator 3.1% (v./v.) of a solution of hexamine prepared by dissolving 107 lbs. of hexamine in 30 gallons of water. The slurry comprised 15 gallons of binding liquid and 400 lbs. of the fireclay grog. The fireclay grog must contain not more than 26% and not less than 30% of material passing a 200 mesh sieve. The invested pattern was vibrated to pack the refractory material round the pattern and consolidate the mould. When packing is complete, any fine refractory material must be trimmed off the top of the mould before the binding liquid gels. After the binding liquid had gelled the mould was heated to 98° C. for 12 hours to dry it and remove the pattern, then fired to 1050° C. in the course of 10 hours prior to the casting operation.

*Example XIV*

A wax pattern was dipped in the coating composition described in Example XIII then immediately dusted with calcined kaolin having the particle size distribution given below:

| Sieve mesh number: | Percentage retained |
|---|---|
| 30 | Nil |
| 52 | 33.4 |
| 72 | 41.2 |
| 100 | 23.7 |
| 150 | 0.9 |
| 200 | 0.3 |
| Pass 200 | 0.3 |

The coating was then hardened by exposure to carbon dioxide for two minutes. The covered pattern was then again dipped in the coating composition and immediately dusted with the calcined kaolin used in the previous dusting operation. This coating was then hardened by exposure to carbon dioxide.

The mould was then formed from the coated pattern by investing it with a slurry of fireclay grog and acid sodium silicate solution, following the method given in Example XIII. Prior to the casting operation the mould was processed as described in Example XIII.

*Example XV*

An initial coating using a silica aquasol sold under the British registered trademark of "Syton" as Syton 2X was prepared as described in Example XI. The coating composition used in conjunction with the foregoing initial coating composition was prepared from sodium silicate and ammonia, as described in Example XI.

A wax pattern was dipped in the initial coating composition, then allowed to dry for between 1 and 3 hours, preferably for 2½ to 3 hours. The coated pattern was then dipped in the sodium silicate-ammonia coating composition, then dusted with sillimanite, followed by hardening the coating by the action of carbon dioxide. Five minutes later, the sequence of dipping in the sodium silicate-ammonia coating composition, dusting with sillimanite, then hardening the coating by the action of carbon dioxide, was repeated. A suitable sillimanite for use in the dusting operation is a sillimanite powder having the particle size distribution given in Example VIII.

The coated pattern was allowed to stand overnight at normal room temperature, then attached to a base-plate, and the mould formed by investing the coated pattern with a slurry of fireclay grog and acid sodium silicate solution, following the method given in Example XIII.

Prior to the casting operation the mould was processed as described in Example XIII.

We claim:

1. The method of forming a coating on an expendable pattern for precision casting consisting in applying thereto a finely divided refractory material suspended in a liquid containing ammonia, water, and a silicate from the group consisting of sodium and potassium, and hardening the coating by the application of carbon dioxide.

2. The method of forming a coating on an expendable pattern by applying thereto a finely divided refractory suspended in a liquid containing ammonia, water, and a silicate from the group consisting of sodium and potassium, dusting a refractory on to the coat while wet, and hardening the coat by the application of carbon dioxide.

3. The method claimed in claim 2 in which the process of coat forming is performed more than once so that a shell is formed on the pattern by a series of coats.

4. The method claimed in claim 1 in which the silicate is in solution in the water.

5. The method claimed in claim 1 in which the silicate is in solution in water which contains an organic solvent miscible with water.

6. The method claimed in claim 1 in which the pattern is given a refractory coat before the first application of the ammonia and silicate solution.

7. The method as claimed in claim 1 in which the pattern includes a preformed refractory core.

8. A mould for precision casting formed around an expendable pattern by applying thereto a refractory suspended in a solution containing ammonia, water, and a silicate from the group consisting of sodium and potassium, dusting the coat so formed while wet with a refractory, hardening the coat by the application of carbon dioxide, and repeating the process at least once.

9. A mould for precision casting in which a shell is formed around an expendable pattern by applying thereto a refractory suspended in a solution containing ammonia, water, and a silicate from the group consisting of sodium and potassium, dusting the coat so formed with a refractory while wet, hardening the coat by the application of carbon dioxide, and repeating the process at least once, removing the pattern from the shell and supporting said shell in a powdered refractory investment.

10. The method of forming a mould for precision casting which comprises forming a coating on an expendable pattern by applying thereto a finely divided refractory suspended in a liquid containing ammonia, water, and a silicate from the group consisting of sodium and potassium, dusting a refractory on to the coat while wet, and hardening the coat by the application of carbon dioxide, repeating the process at least once, investing the coated pattern with a comminuted refractory suspended in a suitable binding liquid, removing the pattern, and firing the mould prior to casting.

11. The method as claimed in claim 10, in which the binding medium is a hydrolysed ethyl silicate solution.

12. A mould for precision casting formed by the method claimed in claim 11.

13. The method of forming a mould for precision casting which comprises forming an initial refractory coat on an expendable pattern in known manner, thereafter applying thereto a finely divided refractory suspended in a liquid containing ammonia, water, and a silicate from the group consisting of sodium and potassium, dusting a refractory on to the coat while wet, and hardening the coat by the application of carbon dioxide, repeating the process at least once, investing the coated pattern with a comminuted refractory suspended in a suitable binding liquid, removing the pattern, and firing the mould prior to casting.

14. A mould for precision casting formed by the method claimed in claim 10.

15. A mould for precision casting formed by the method claimed in claim 13.

16. The method of forming a self-supporting mould for precision casting comprising applying a refractory coating to an expendible pattern, then applying a finely divided refractory material suspended in a water solution of a silicate from the group consisting of sodium and potassium and containing ammonia, dusting a dry, coarser refractory on the applied material, hardening the applied material by the application of carbon dioxide, and further hardening the mould by immersion in an hydrolysed ethyl silicate solution until bubbling ceases.

17. The method of forming a coating on an expendible pattern in accordance with claim 2 in which the coating is further hardened by immersion in an hydrolysed ethyl silicate solution until bubbling ceases.

References Cited in the file of this patent

UNITED STATES PATENTS

| | | |
|---|---|---|
| 2,380,945 | Collins | Aug. 7, 1945 |
| 2,682,092 | Henricks | June 29, 1954 |
| 2,701,902 | Strachan | Feb. 15, 1955 |
| 2,703,913 | Hinde | Mar. 15, 1955 |

FOREIGN PATENTS

| | | |
|---|---|---|
| 15,619 | Great Britain | July 15, 1899 |
| 722,816 | Great Britain | Feb. 2, 1955 |

OTHER REFERENCES

"Carbon Dioxide Process for 'Baking' Molds and Cores" (Schumacher), published by American Foundryman, September 1954, pp. 46–49.